(12) United States Patent
Kumar et al.

(10) Patent No.: US 10,324,807 B1
(45) Date of Patent: Jun. 18, 2019

(54) FAST NATIVE FILE SYSTEM CREATION FOR BACKUP FILES ON DEDUPLICATION SYSTEMS

(71) Applicant: EMC IP Holding Company LLC, Hopkinton, MA (US)

(72) Inventors: Mv Kiran Kumar, Bangalore (IN); Manjunath Jagannatha, Bangalore (IN); Ravi Shankar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/724,201

(22) Filed: Oct. 3, 2017

(51) Int. Cl.
*G06F 12/00* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0665* (2013.01); *G06F 3/0689* (2013.01); *G06F 11/1435* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,618,736 B1 * | 9/2003 | Menage | G06F 3/0601 |
| 2009/0164529 A1 * | 6/2009 | McCain | G06F 11/1464 |
| 2013/0346709 A1 * | 12/2013 | Wang | G06F 11/1456 711/162 |
| 2014/0181579 A1 * | 6/2014 | Whitehead | G06F 17/30289 714/15 |
| 2017/0075708 A1 * | 3/2017 | Dalal | G06F 9/45533 |

* cited by examiner

*Primary Examiner* — Daniel D Tsui
(74) *Attorney, Agent, or Firm* — Dergosits & Noah LLP; Todd A. Noah (57) ABSTRACT

Native file system creation for backup files is described. A system creates a virtual disk template corresponding to a disk associated with a client device. The system sends a copy of the virtual disk template as template data. The system sends a copy of a file on the disk as file data. The system stores a backup file in a file system format that is native to the client device by combining the template data and the file data. The system restores a file in the backup file to the disk via mounting the backup file as a virtual disk on the client device.

20 Claims, 4 Drawing Sheets

| Master Boot Record 210 | Partition Table Header 212 | Partition Table Primary Entries 214 | Virtual Disk & Volume Contents 216 | Partition Table Entries 218 | Partition Table Header 220 |

FAST NATIVE FILE SYSTEM CREATION FOR BACKUP FILES ON DEDUPLICATION SYSTEMS

BACKGROUND

If a software error corrupts a computer's data set, or if erroneous data updates the data set, a data protection administrator may restore the data set to a previous state that does not include the corrupted or erroneous data. A backup application executes a backup operation either occasionally or continuously to enable this restoration, storing a copy of each desired data set state (such as the values of its data and these values' embedding in data structures) within dedicated backup files. When the data protection administrator decides to return the data set to a previous state, the data protection administrator specifies the desired previous state by identifying a desired point in time when the data set was in this state, and instructs the backup application to execute a restore operation to restore a copy of the corresponding backup file(s) for that state to the data set.

A backup file can be a copy of part or all of a data set, and can be used to restore part or all of the data set to the condition of the data set at the point in time that the copy was created. A full backup file represents an entire data set at the point in time that the full backup file was created. As a data set increases in size, a full backup file requires more time to be created and requires more storage space. Therefore, a database administrator can supplement a full backup file of a large data set with a series of incremental backup files, or differential backup files, each of which can be a copy of the modifications to a data set since the most recent copy of the entire data set or since the most recent copy of modifications to the data set. If the backup/restore application identifies that the most recently created backup file for a data set is not a full backup file, the backup/restore application can combine the most recently created backup file for the data set with other backup files created for the data set into a synthetic full copy of the backed-up dataset. For example, after a backup/restore application creates a full backup file of a hard disk's entire data set, a user modifies data blocks in only one of the hard disk sectors, and the backup/restore application subsequently creates an incremental backup file of the hard disk's modified sector. Then the backup/restore application combines the current incremental backup file of the hard disk's modified sector with the previous full backup file of the hard disk to create a synthetic full backup file that includes the hard disk's recently modified sector as a replacement for the previous version of the modified sector and also includes the rest of the hard disk's previous data set.

De-duplicating can be a specialized data compression process used by a backup/restore application for eliminating most identical copies of repeating data. In deduplication process, unique blocks of data are identified and stored during analysis. As the analysis continues, other data blocks are compared to the already stored data blocks, and whenever a match occurs, the redundant data block is replaced in the backup file with a small reference that points to the matching data block that is already stored. Given that the deduplication process may identify the same unique data block dozens, hundreds, or even thousands of times, the amount of data that needs to be stored can be greatly reduced.

A data set can be a collection or a group of information that is backed up as a unit, such as the information for a computer or a network of computers. A data set may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create backups files of data sets and store the backup files of data sets on one or more storage arrays.

A virtual machine can be a software implementation of a computer, and executes programs like a physical computer. A system virtual machine provides a complete system platform which supports the execution of a complete operating system, and usually emulates an existing architecture. Multiple instances of virtual machines lead to more efficient use of computing resources, both in terms of energy consumption and cost effectiveness, known as hardware virtualization, the key to a cloud computing environment. A virtual machine typically includes a virtual disk, which may be stored in file formats for virtual disks such as VHD, VHDx, and VMDK. A virtual disk can be a software component that emulates a physical storage device. A disk can be a data storage device. A volume can be a single accessible storage area with a file system, typically resident on a single partition of a disk. A cluster is the smallest logical unit of disk space, such as one or more disk sectors, that can be allocated for storing files and/or directories. To reduce the overhead of managing on-disk data structures, a file system allocates an extent of contiguous clusters, each of which is a group of one or more disk sectors, instead of allocating individual disk sectors by default. An extent can be any number of consecutive logical units of disk space. A file extent can be a number of consecutive logical units of disk space used to store a collection of information under a single identifying name. Similar to other data sets, backup/restore applications make copies of a virtual machine's data set and store these copies as backup files that enable the backup/restore application to restore the virtual machine's data set in the event of corruption or an erroneous update to the virtual machine's data set.

DETAILED DESCRIPTION

Even if a backup file for a disk is stored to a fast access disk in a storage array, a significant amount of time may be required to send the backup file, or a file within the backup file, to a client that requested the backup file to restore at least part of the disk. Since a backup/restore application typically stores backup files in a proprietary format, a fast access disk that stores a disk's backup file cannot be mounted to a client to achieve instant uptime of the files in the backup file because the client's native file system cannot read these files stored in the backup/restore application's proprietary format.

Methods and systems are provided for native file system creation for backup files. First, a brief summary of a method for native file system creation for backup files will be described. Next, a system for native file system creation for backup files will be described with reference to example embodiments. Then data structures for native file system creation for backup files will be described with reference to example embodiments. After that, a method for native file system creation for backup files will be described with reference to example embodiments Native file system creation for backup files is described. A virtual disk template is created that corresponds to a disk associated with a client device. A copy of the virtual disk template is sent as template data. A copy of a file on the disk is sent as file data. A backup file is stored in a file system format that is native to the client device by combining the template data and the file data. A file in the backup file is restored to the virtual disk via mounting the backup file to the client device.

For example, when requested to create a backup for a client device, a NetWorker® backup and restore application creates a virtual disk template, and formats the template using the client's New Technology File System (NTFS) system format. Next, the NetWorker® backup and restore application streams a copy of the template as template data, and streams a copy of the blocks occupied by a source file on the disk as file data. Then the NetWorker® backup and restore application combines the template data and the file data to create and store a NTFS-formatted backup file of the disk. When the client requests the restoration of one of the disk's database files from the backup file, the NetWorker® backup and restore application mounts the backup file as a virtual disk, which contains the requested database file, on the client.

Figure 1:
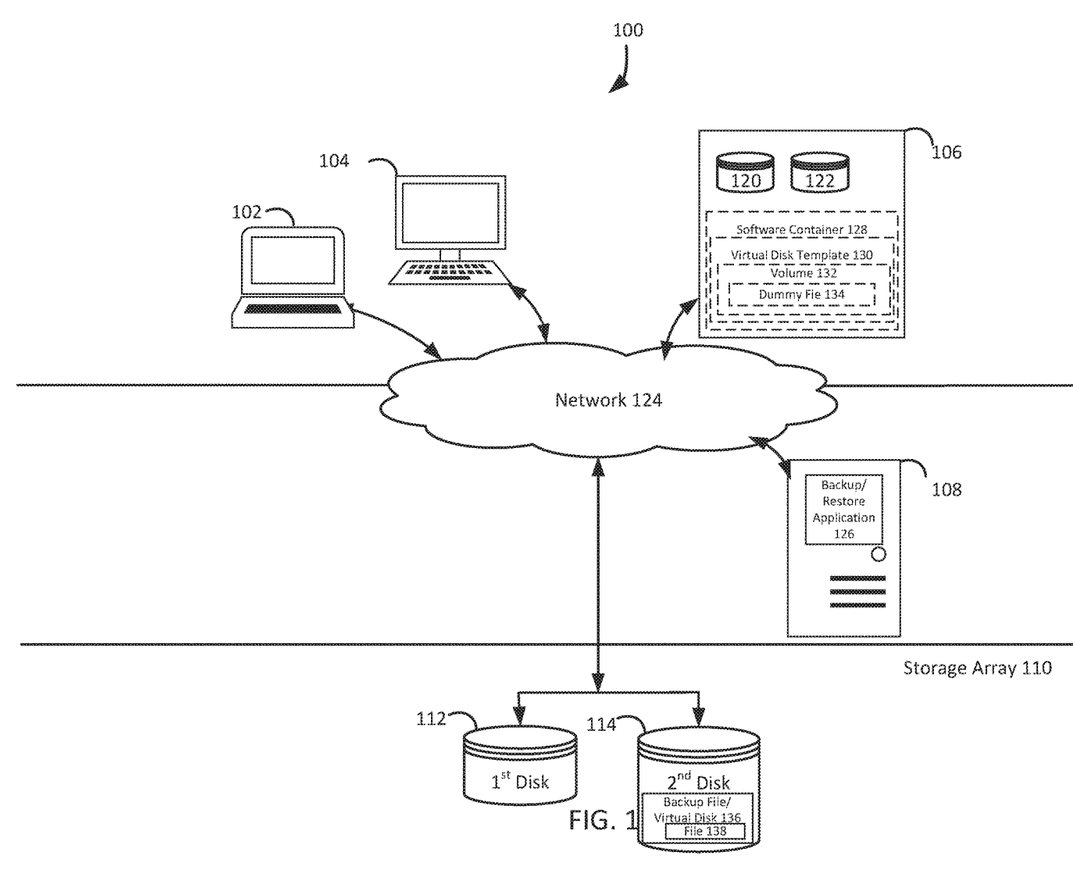
FIG. 1 illustrates a block diagram of an example system for native file system creation for backup files.

FIG. 1 illustrates a block diagram of a system 100 that implements native file system creation for backup files, under an embodiment. As shown in FIG. 1, the system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. The storage array 110 includes a first array disk 112 and a second array disk 114. Although FIG. 1 depicts the first client 102 as the laptop computer 102, the second client 104 as the personal computer 104, and the third client 106 as the server 106, any of the clients 102-106 may be any type of computer, such as the hardware device 400 depicted in FIG. 4 and described below. Any of the clients 102-106 may be a computer capable of hosting multiple virtual machines, such as the client 106 that includes a first local disk 120 and a second local disk 122. Although FIG. 1 depicts the local disks 120-122 as internal to the client 106, any of the local disks 120-122 can be external to the client 106, and may be any combination of hard disks 120-122 and/or virtual disks 120-122. The clients 102-106, the server 108, and the storage array 110 communicate via a network 124. Since the server 108 includes a backup/restore application 126, the server 108 may be referred to as the backup server 108. Although following paragraphs describe EMC Corporation's Avamar® backup/restore application and EMC Corporation's NetWorker® backup/restore application as examples of the backup/restore application 126, the backup/restore application 126 may be any other backup/restore application which provides the backup/restore functionalities described in the Background section.

Although FIG. 1 depicts the system 100 with three clients 102-106, one server 108, one storage array 110, two array disks 112-114, two local disks 120-122, one network 124, and one backup/restore application 126, the system 100 may include any number of clients 102-106, any number of servers 108, any number of storage arrays 110, any number of array disks 112-114, any number of local disks 120-122, any number of networks 124, and any number of backup/restore applications 126. While FIG. 1 depicts the backup/restore application 126 residing completely on the server 108, the backup/restore application 126 may reside completely on any of the clients 102-106, completely on the server 108, completely on another server that is not depicted in FIG. 1, or in any combination of partially on the clients 102-106, partially on the server 108, and partially on the other server that is not depicted. The clients 102-106 and the server 108 may each be substantially similar to the hardware device 400 depicted in FIG. 4 and described below.

Although the following paragraph describes EMC Corporation's Avamar® backup/restore application as an example of the backup/restore application 126, the backup/restore application 126 may be any other backup/restore application which provides the backup/restore functionalities described in the Background section. The backup/restore application 126 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

Although the following paragraph describes EMC Corporation's NetWorker® backup/restore application as an example of the backup/restore application 126, the backup/restore application 126 may be any other backup/restore application which provides the backup/restore functionalities described in the Background section. The backup/restore application 126 may be EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and periodic operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

Figure 2A:
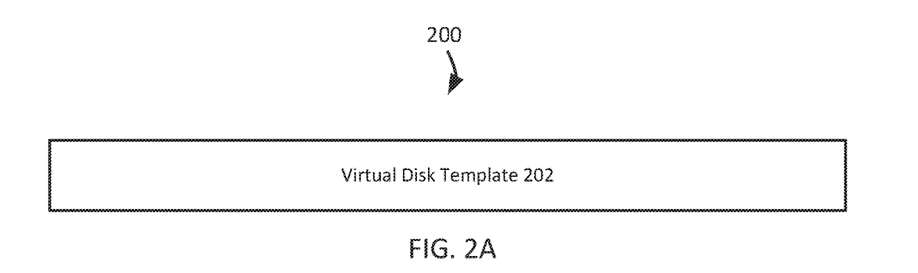
FIGS. 2A-D are examples of data structures for native file system creation for backup files, under an embodiment.

When requested to create a backup file for a client device, the system 100 creates a native file system-formatted virtual disk template based on one of the client's disks. For example, and without limitation, this can include a component of the NetWorker® backup and restore application 126, which resides on the client 106, creating the software container 128 that is local to the client 106, creating the virtual disk template 130 in the software container 128, based on the client's local disk 122, and formatting the virtual disk template 130 using the NTFS file system that is native to the client 106. A virtual disk template can be a preset format for a software component that emulates a physical storage device, which is used so that the software component format does not have to be recreated each time it is used. An example of the virtual disk template 130 is depicted in FIG. 2A as a virtual disk template 202, and described below in reference to FIGS. 2A-D. A client device can be a computer that is capable of obtaining information and/or applications from a server.

Figure 2B:
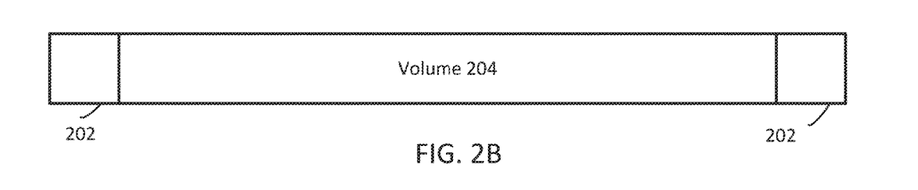
Figure 2C:
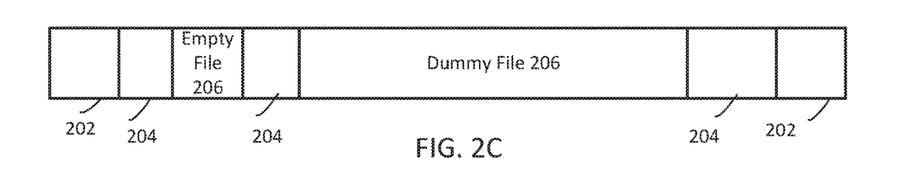

Creating the virtual disk template may include identifying a size associated with the disk, creating the virtual disk template based on the size, mounting the virtual disk template on the client device, creating a volume in the virtual disk template, formatting the volume with the file system format that is native to the client device, creating a directory corresponding to a directory structure of a file on the disk, creating a dummy file without data to represent the file; reserving file extents, corresponding to file extents of the file, on the volume and unmounting the virtual disk template from the client device. For example, the client's NetWorker® component identifies the size of the local disk 122 as 3 megabytes, creates the software container 128 in the VHD format and sufficiently large to hold a 3 megabytes virtual disk template, mounts the software container 128 on the client 106, and creates the 3 megabytes virtual disk template 130 in the software container 128. Continuing the example, the client's NetWorker® component creates the volume 132 in the virtual disk template 130 that is the same size as a volume in the local disk 122, and formats the volume 132 using the client's NTFS system format. An example of the volume 132 is depicted in FIG. 2B as a volume 204, and described below in reference to FIGS. 2B-C. Further to the example, the client's NetWorker® component creates a dummy file 134 in the volume 132 that is large enough to store a copy of a source file in the volume in the local disk 122, creates a directory on the volume 132 that matches the directory for the source file on the local disk 122, reserves file extents that stores the file extent information for the source file in the volume in the local disk 122, sets attributes and security information, synchronizes the file system, and unmounts the virtual disk template 130 from the client 106. An example of the dummy file 134 in the volume 132 is depicted in FIG. 2C as a dummy file 206, and described below in reference to FIG. 2C.

Creating the virtual disk template may also include identifying an offset from a beginning of the disk to a beginning of a volume in the disk, identifying file extent information for the volume in the disk, and creating a file extent offset by combining the offset and the file extent information. For example, the client's NetWorker® component identifies an offset of 5 clusters from the beginning of the local disk 122 to the beginning of the volume in the local disk 122, identifies a file extent that ranges from cluster number 6 to cluster number 40 in the volume in the local disk 122, and creates a file extent offset of 11 to 45 by combining the offset and the file extent information. Consequently, the client's NetWorker® component creates the volume 204 at an offset of 5 virtual clusters from the beginning of the virtual disk template 202, and stores the dummy file 206 from the virtual cluster number 11 of the virtual disk template 202 to the virtual cluster number 11 of the virtual disk template 202. The system 100 also uses the file extent offset when creating a backup file for the local disk 122, as described below.

After creating the virtual disk template, the system 100 sends a copy of the virtual disk's template as template data that is used to create a backup file for the disk. By way of example and without limitation, this can include the client's NetWorker® component streaming a copy of the virtual disk template 130 as template data to the backup server 108. A copy can be a thing made to be similar or identical to another thing. Template data can be information associated with a preset format for a software component that emulates a physical storage device, which is used so that the software component format does not have to be recreated each time it is used.

After or while sending a copy of the virtual disk template, the system 100 sends a copy of a file on the disk as file data that is used to create a backup file for the disk. In embodiments, this can include the client's NetWorker® component streaming a copy of the data blocks in a source file in the local disk 122 as file data to the backup server 108. A data block can be a piece of information that is processed as a unit. File data can be a collection of information stored in a computer's memory and/or on a storage device under a single identifying name.

Having sent copies of the source file in the local disk and the virtual disk's template as data, the system 100 combines template and file data to create and store a backup file in a client's native file system format so that the client can mount the backup file as a virtual disk. For example, and without limitation, this can include a component of the NetWorker® backup and restore application 126, which resides on the backup server 108, using a block based backup synthetic full consolidation workflow to combine the template data and the file data to create and store the NTFS-formatted backup file 136 for the local disk 122, which can be mounted to the client 106 as the virtual disk 136. A file system format can be the way that information is arranged by the structure and logic rules used to manage groups of information and their names. Native can be something designed for or built into a given system, such as a language associated with a given processor, computer, or compiler, and programs written in the language.

Combining the template data and the file data may include determining if a stream of data includes any specified file extent information, processing the stream of data as template data if the stream of data does not include any specified file extent information, and processing the stream of data as file data if the stream of data includes any specified file extent information. For example, a translator/mapper engine component of the NetWorker® backup and restore application 126, which resides on the backup server 108, receives a stream of data and determines if the stream of data includes the cluster numbers within the range of the file extents offset 11 to 40, which was identified during the creation of the virtual disk template 130 by the client's NetWorker® component. Continuing this example, if the received stream of data for the local disk 122 includes the virtual cluster number 6, then this stream of data is data for the virtual disk template 130, such that the server's NetWorker® a component processes this stream of data as template data. Further to this example, if the received stream of data for the local disk 122 includes the cluster number 30, then this stream of data is data for the source file in the volume in the local disk 122, such that the server's NetWorker® component processes this stream of data as file data. Therefore, the server's NetWorker® component implements a block based backup synthetic full consolidation workflow by processing the template data for the virtual disk template 130 and not processing the corresponding data in the local disk 122, processing the file data for the source file in the volume in the local disk 122 and not processing the corresponding data in the dummy file 134, and then processing the remaining template data in the virtual disk template 130 and not processing the corresponding data in the local disk 122.

Processing the stream of data as file data may include converting a logical address associated with file data to a relative address, rebasing the relative address, and storing the rebased address, in association with the file data, to the backup file. For example, the client's NetWorker® component streams a copy of the data blocks in the source file in the volume in the local disk 122, including a data block identified by a target logical file block, as file data to the backup server 108. A translator/mapper engine for the NetWorker® backup and restore application 126, which resides on the backup server 108, receives and identifies the file data, and converts the target logical file block identifier for the data block to a target file relative block identifier for the data block, thereby converting a block identifier that could be used directly by the targeted storage array 110 to a block identifier that is relative for the targeted storage array 110. Next, the server's translator/mapper engine converts the target file relative block identifier for the data block to a source file relative block identifier for the data block, thereby converting a block identifier that is relative for the targeted storage array 110 into a block identifier that is relative for the source local disk 122. Then the server's translator/mapper engine rebases the source file relative block identifier for the data block to a rebased source file relative block identifier for the data block, thereby converting into a block identifier that is relative for the source local disk 122 into a block identifier that is based on the source local disk 122. The combined process of converting the target logical file block identifier for the data block to a rebased source file relative block identifier for the data block results in the backup file 136 using the same block identifier for each data block that the local disk 122 uses for the corresponding data block. The same block identifier for each data block in the backup file 136 enables the client 106 to mount and read each data block in the backup file 136 as if the client device 106 was reading each data block in the local disk 122.

After using a virtual disk template to create a backup file in a client's native file system format, the system 100 can delete the virtual disk template that was temporarily used to create the backup file, thereby conserving system resources. By way of example and without limitation, this can include the client's NetWorker® component deleting the virtual disk template 130.

Having created a native file system-formatted backup file for a client's local disk, the system 100 mounts the native file system-formatted backup file to the client as a virtual disk so that the client can instantly restore any or all of the backup file's individual files. In embodiments, this can include the NetWorker® backup and restore application 126 using the Microsoft Windows VHD mount Application Programming Interface (API) to mount the NTFS-formatted backup file 136 for the virtual disk 122 as the virtual disk 136 when the client 106 requests the restoration of the database file 138 in the backup file 136 to the local disk 122. Mounting the backup file 136 as the virtual disk 136 enables the client 106 to achieve instant uptime of the database file 138 in the backup file 136 because the client's NTFS file system can read the database file 138 stored in the NTFS format. Mounting can be a process which an operating system makes files and directories on a storage device available for a user to access via the computer's file system. Since the backup file 136 for the local disk 122 is being mounted as the virtual disk 136 on the client device 106, and the client device 106 already includes the local disk 122, a possibility is created for a disk signature collision. Therefore, the NetWorker® backup and restore application 126 uses a globally unique identifier stream layout to stream the backup file 136. An example of the backup file stream layout based on the Globally unique identifier Partition Table (GPT) format is depicted in FIG. 2D as a stream layout 208, and described below in reference to FIG. 2D.

Figure 2D:
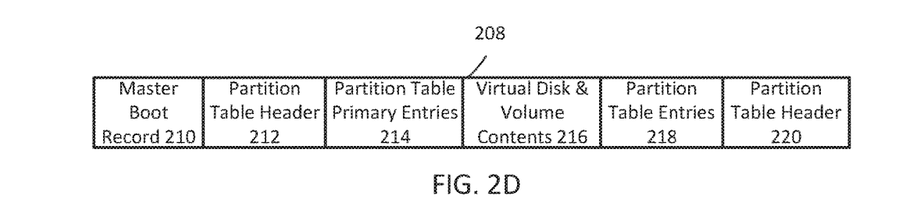

FIGS. 2A-D are examples of data structures for native file system creation for backup files. The NetWorker® backup and restore application 126 creates the software container 128 that is local to the client 106, creates the virtual disk template 130 in the software container 128, based on the client's local disk 122, and uses the client's NTFS file system to format the virtual disk template 130 as the virtual disk template 202, which is depicted in FIG. 2A. The NetWorker® backup and restore application 126 creates the volume 204 in the virtual disk template 202 that is the same size as the volume in the local disk 122, and uses the client's NTFS format to format the volume 204, which is depicted in FIG. 2B. The NetWorker® backup and restore application 126 creates a dummy file 206 on the volume 204 that is large enough to store a copy of the source file in the volume in the local disk 122, as depicted in FIG. 2C. If the volume on the local disk 122 does not store all data blocks contiguously, such as when a user deletes data from an intermediate portion of the volume, then the dummy file 206 is not contiguous, as depicted in FIG. 2C. The NetWorker® backup and restore application 126 uses a globally unique identifier stream layout 208, which is depicted in FIG. 2D, to stream and store the backup file 136. The stream layout 208 includes a master boot record 210, a partition table header 212, partition table primary entries 214, virtual disk and container contents 216, partition table entries 218, and a partition table header 220.

Figure 3:
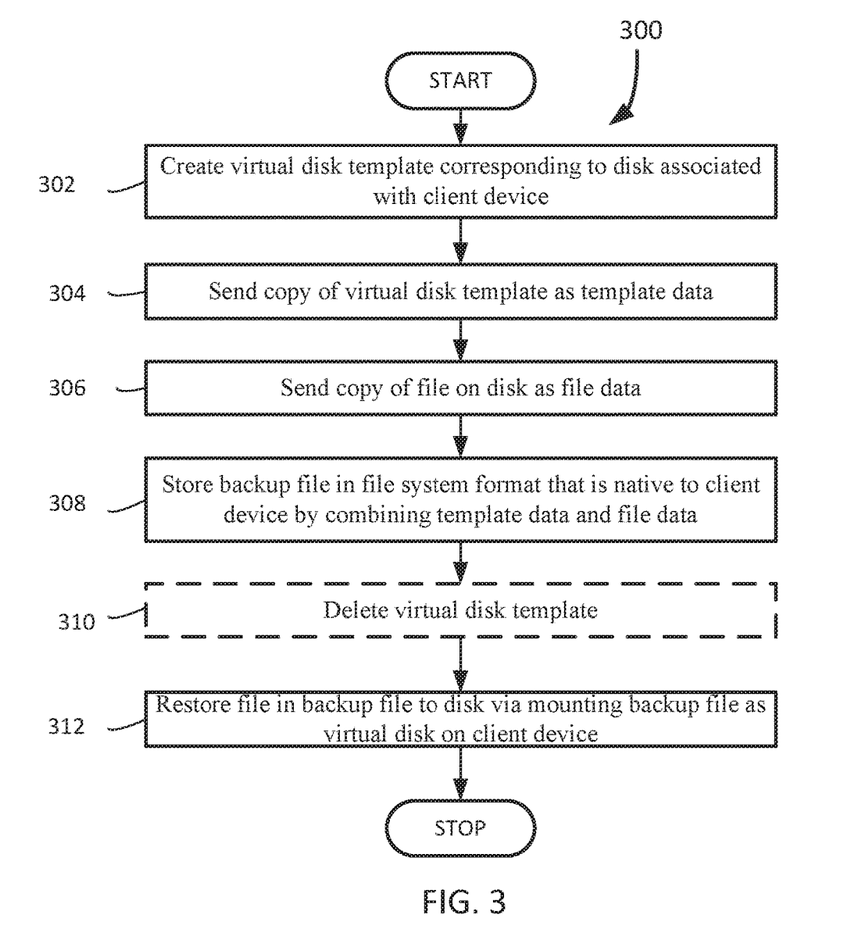
FIG. 3 is a flowchart that illustrates a method of native file system creation for backup files, under an embodiment.

FIG. 3 is a flowchart that illustrates a method for native file system creation for backup files, under an embodiment. Flowchart 300 illustrates method acts illustrated as flowchart blocks for certain steps involved in and/or between the clients 102-106 and/or the server 108 of FIG. 1.

When a backup file for the client device is requested, a virtual disk template is created that corresponds to a disk associated with the client device, box 302. The system 100 creates a native file system-formatted virtual disk template for a client's local disk. For example, and without limitation, this can include the client's NetWorker® component creating the software container 128 that is local to the client 106, creating the virtual disk template 130 in the software container 128, based on the client's local disk 122, and formatting the virtual disk template 130 using the client's NTFS system format.

Having created a virtual disk template based on a client's local disk, a copy of the virtual disk template is sent as template data, box 304. The system 100 sends a copy of the virtual disk's template to create a backup file for the client's local disk. By way of example and without limitation, this can include the client's NetWorker® component streaming a copy of the virtual disk template 130 as template data to the backup server 108.

After or while sending a copy of a virtual disk template, a copy of a file in the disk is sent as file data, box 306. The system 100 sends a copy of a local disk to create a backup file for the local disk. In embodiments, this can include the client's NetWorker® component streaming a copy of the second local disk 122 as file data to the backup server 108.

Having sent copies of the file in the client's local disk and the virtual disk's template, a backup file is stored in a file system format that is native to a client device by combining template data and file data, box 308. The system 100 combines the template and file data to create and store a backup file in a client's native file system format so that the client can mount the backup file as a virtual disk. For example, and without limitation, this can include the server's NetWorker® component combining the template data and the file data to create and store the NTFS-formatted backup file 136 for the local disk 122.

After using a virtual disk template to create a backup file in a client's native file system format, the virtual disk template is optionally deleted, box 310. The system 100 can delete the virtual disk template that was temporarily used to create the backup file, thereby conserving system resources. By way of example and without limitation, this can include the client's NetWorker® component deleting the virtual disk template 130.

Having created a backup file for a client's local disk, a file in the backup file is restored to the disk via mounting the backup file on a client device as a virtual disk, box 312. The system 100 mounts the native file system-formatted backup file to a client as a virtual disk so that the client can instantly restore any or all of the backup file's individual files. In embodiments, this can include the NetWorker® backup and restore application 126 mounting the NTFS-formatted backup file 136 for the local disk 122 as the virtual disk 136 when the client 106 requests the restoration of the database file 138 in the backup file 136 to the local disk 122. Mounting the backup file 136 as the virtual disk 136 enables the client 106 to achieve instant uptime of the database file 138 in the backup file 136 because the client's NTFS file system can read the database file 138 stored in the NTFS format.

Although FIG. 3 depicts the blocks 302-312 occurring in a specific order, the blocks 302-312 may occur in another order. In other implementations, each of the blocks 302-312 may also be executed in combination with other blocks and/or some blocks may be divided into a different set of blocks.

Figure 4:
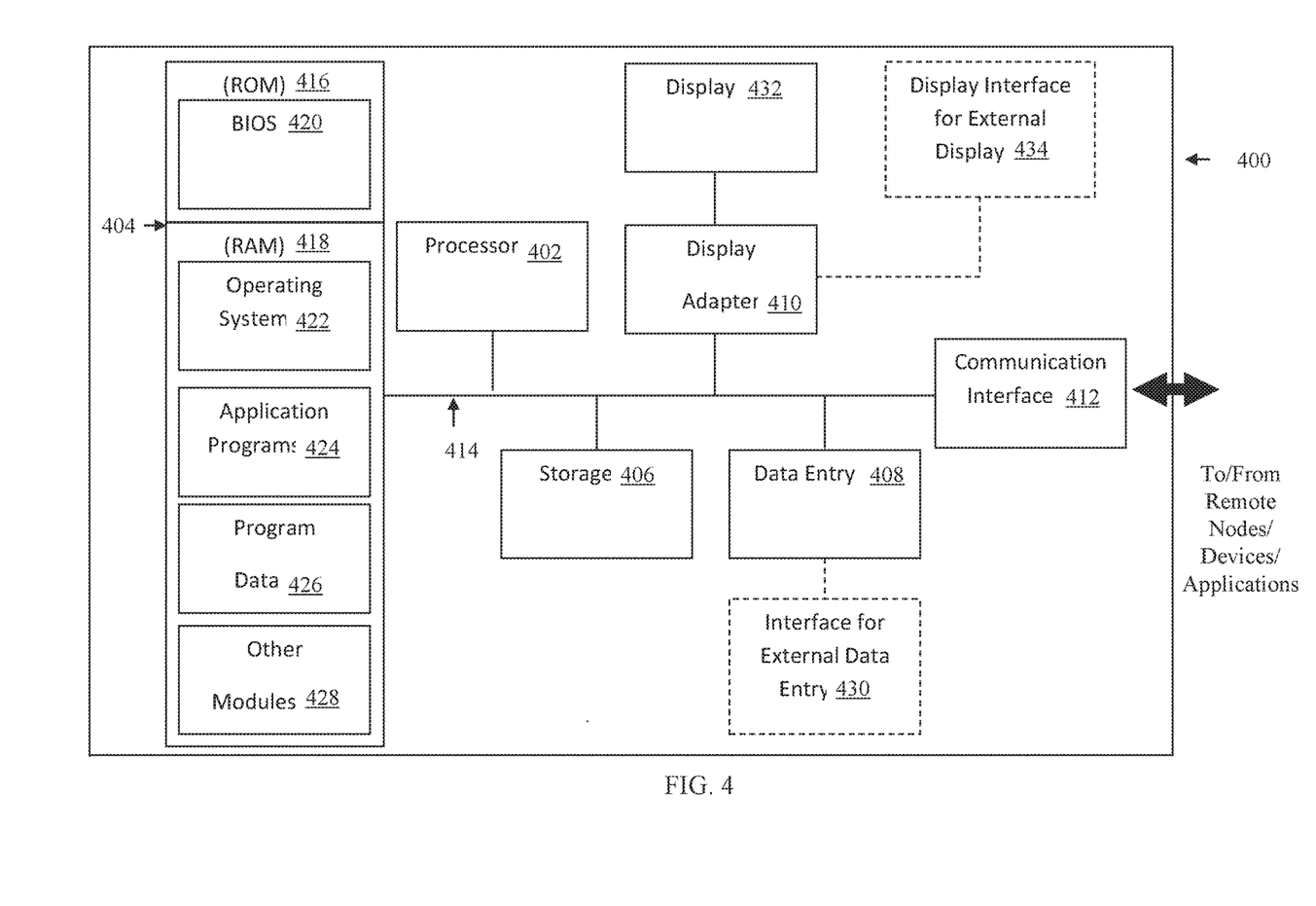
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
   a processor-based application, which when executed on a computer, will cause the processor to:
   create a virtual disk template corresponding to a disk associated with a client device;
   send a copy of the virtual disk template as template data;
   send a copy of a file on the disk as file data;
   store a backup file in a file system format that is native to the client device by combining the template data and the file data; and
   restore a file in the backup file to the disk via mounting the backup file as a virtual disk on the client device.

2. The system of claim 1, wherein creating the virtual disk template comprises:
   identifying a size associated with the disk;
   creating a virtual disk template based on the size;
   mounting the virtual disk template on the client device;
   creating a volume in the virtual disk template;
   formatting the volume with the file system format that is native to the client device;
   creating a directory, corresponding to a directory structure of a file on the disk, on the volume;
   creating a dummy file without data to represent the file;
   reserving file extents, corresponding to file extents of the file on the volume; and
   unmounting the virtual disk template from the client device.

3. The system of claim 1, wherein creating the virtual disk template comprises:
   identifying an offset from a beginning of the disk to a beginning of a volume in the disk;
   identifying file extent information for the volume in the disk; and
   creating a file extent offset by combining the offset and the file extent information.

4. The system of claim 1, wherein combining the template data and the file data comprises:
   determining if a stream of data comprises any specified file extent information;
   processing the stream of data as file data in response to a determination that the stream of data comprises any specified file extent information; and
   processing the stream of data as template data in response to a determination that the stream of data does not comprise any specified file extent information.

5. The system of claim 4, wherein processing the stream of data as file data comprises:
   converting a logical address associated with file data to a relative address;
   rebasing the relative address; and
   storing the rebased address, in association with the file data, to the backup file.

6. The system of claim 1, wherein the processor-based application further causes the processor to delete the virtual disk template.

7. The system of claim 1, wherein mounting the backup file to the client device is based on a unique identifier of the backup file and a unique identifier of the disk.

8. A computer-implemented method comprising:
   creating a virtual disk template corresponding to a disk associated with a client device;
   sending a copy of the virtual disk template as template data;
   sending a copy of a file on the disk as file data;
   storing a backup file in a file system format that is native to the client device by combining the template data and the file data; and
   restoring a file in the backup file to the disk via mounting the backup file as a virtual disk on the client device.

9. The method of claim 8, wherein creating the virtual disk template comprises:
   identifying a size associated with the disk;
   creating a virtual disk template based on the size;
   mounting the virtual disk template on the client device;
   creating a volume in the virtual disk template;
   formatting the volume with the file system format that is native to the client device;
   creating a directory, corresponding to a directory structure of a file on the disk, on the volume;
   creating a dummy file without data to represent the file;
   reserving file extents, corresponding to file extents of the file, on the volume, and
   unmounting the virtual disk template from the client device.

10. The method of claim 8, wherein creating the virtual disk template comprises:
    identifying an offset from a beginning of the disk to a beginning of a volume in the disk;
    identifying file extent information for the volume in the disk; and
    creating a file extent offset by combining the offset and the file extent information.

11. The method of claim 8, wherein combining the template data and the file data comprises:
    determining if a stream of data comprises any specified file extent information;
    processing the stream of data as file data in response to a determination that the stream of data comprises any specified file extent information; and
    processing the stream of data as template data in response to a determination that the stream of data does not comprise any specified file extent information.

12. The method of claim 11, wherein processing the stream of data as file data comprises:
    converting a logical address associated with file data to a relative address;
    rebasing the relative address; and
    storing the rebased address, in association with the file data, to the backup file.

13. The method of claim 8, wherein the method further comprises deleting the virtual disk template.

14. A computer program product, comprising a non-transitory computer-readable medium having a computer-readable program code embodied therein to be executed by one or more processors, the program code including instructions to:
    create a virtual disk template corresponding to a disk associated with a client device;
    send a copy of the virtual disk template as template data;
    send a copy of a file on the disk as file data;
    store a backup file in a file system format that is native to the client device by combining the template data and the file data; and
    restore a file in the backup file to the disk via mounting the backup file as a virtual disk the client device.

15. The computer program product of claim 14, wherein creating the virtual disk template comprises:
    identifying a size associated with the disk;
    creating the virtual disk template based on the size;
    mounting the virtual disk template on the client device;

creating a volume in the virtual disk template;
formatting the volume with the file system format that is native to the client device;
creating a directory, corresponding to a directory structure of a file on the disk, on the volume;
creating a dummy file without data to represent the file;
reserving file extents, corresponding to file extents of the file, on the volume; and
unmounting the virtual disk template from the client device.

16. The computer program product of claim 14, wherein creating the virtual disk template comprises:
identifying an offset from a beginning of the disk to a beginning of a volume in the disk;
identifying file extent information for the volume in the disk; and
creating a file extent offset by combining the offset and the file extent information.

17. The computer program product of claim 14, wherein combining the template data and the file data comprises:
determining if a stream of data comprises any specified file extent information;
processing the stream of data as file data in response to a determination that the stream of data comprises any specified file extent information; and
processing the stream of data as template data in response to a determination that the stream of data does not comprise any specified file extent information.

18. The computer program product of claim 17, wherein processing the stream of data as file data comprises:
converting a logical address associated with file data to a relative address;
rebasing the relative address; and
storing the rebased address, in association with the file data, to the backup file.

19. The computer program product of claim 14, wherein the program code includes further instructions to delete the virtual disk template.

20. The computer program product of claim 14, wherein mounting the backup file to the client device is based on a unique identifier of the backup file and a unique identifier of the disk.

\* \* \* \* \*